Figure 1:
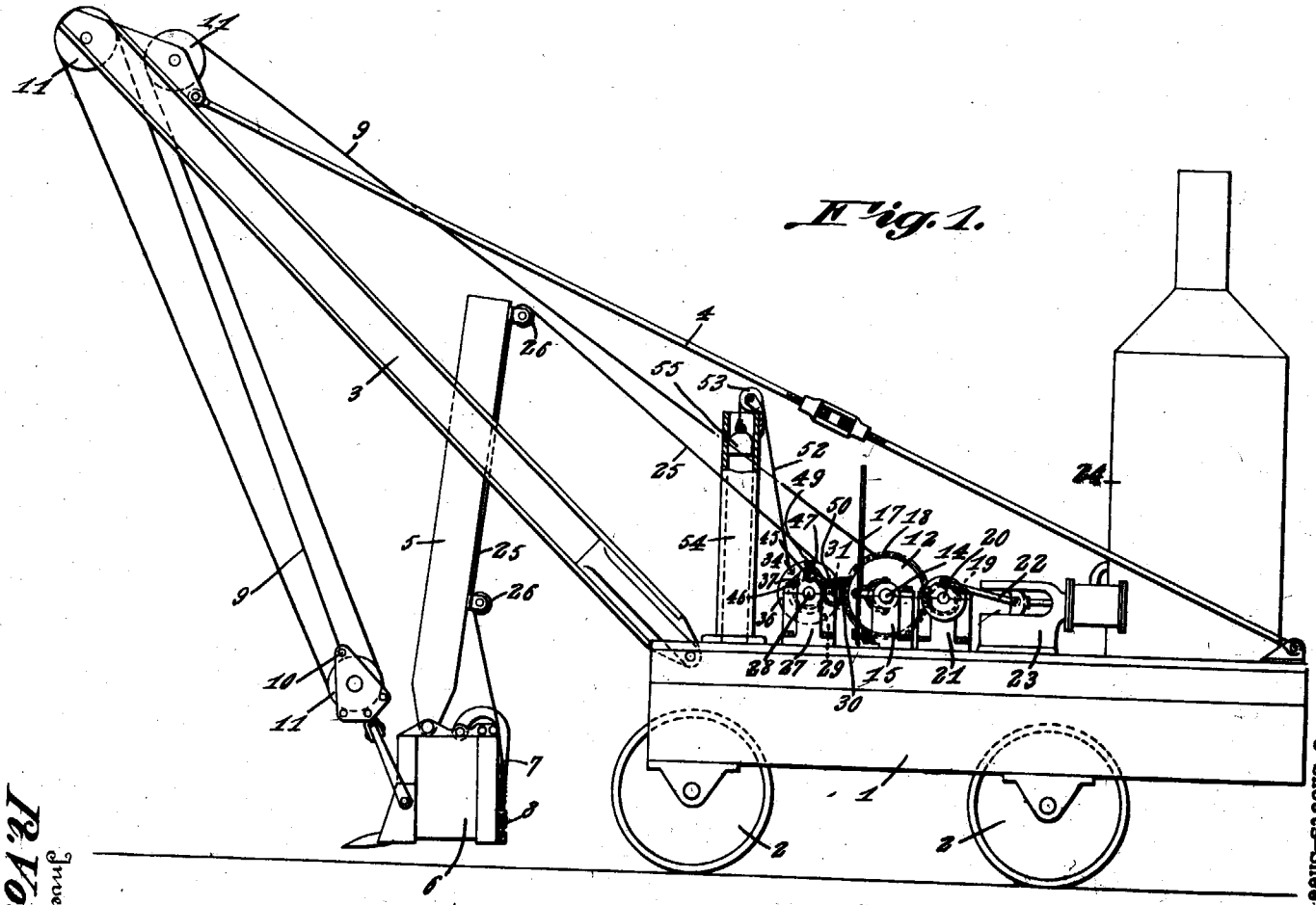

Aug. 18, 1931.

R. VOLK

EXCAVATOR

Re. 18,156

Original Filed Oct. 19, 1921 3 Sheets-Sheet 1

Inventor
R. Volk,

By C. A. Snow & Co.
Attorney

Aug. 18, 1931.

R. VOLK

EXCAVATOR

Re. 18,156

Original Filed Oct. 19, 1921

3 Sheets-Sheet 2

Inventor

R. Volk,

By C. A. Snow & Co.

Attorney

Aug. 18, 1931. R. VOLK EXCAVATOR Re. 18,156
Original Filed Oct. 19, 1921
3 Sheets-Sheet 3
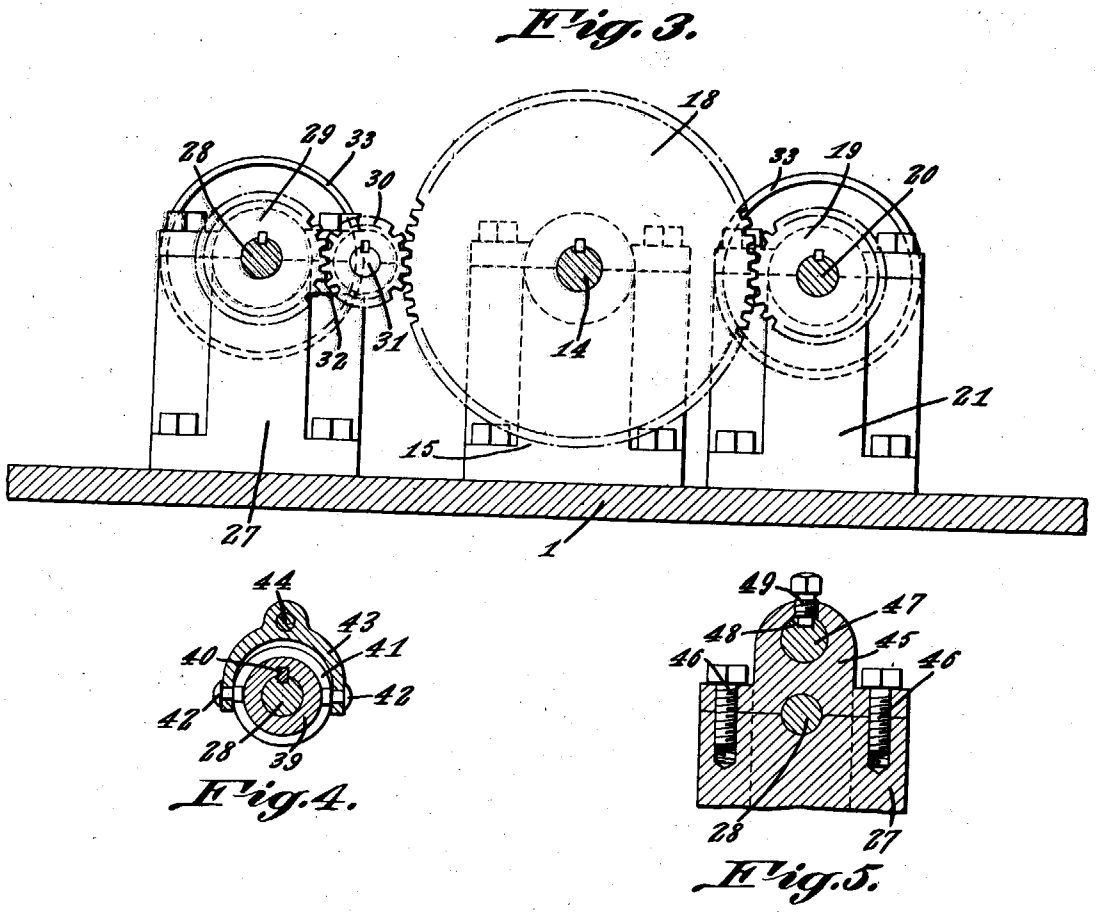
Inventor
R. Volk,
By C. A. Snow & Co.
Attorney Reissued Aug. 18, 1931 Re. 18,156

UNITED STATES PATENT OFFICE

RALPH VOLK, OF PORTLAND, OREGON, ASSIGNOR, BY DIRECT AND MESNE ASSIGNMENTS, TO KOEHRING COMPANY, OF MILWAUKEE, WISCONSIN, A CORPORATION OF WISCONSIN

EXCAVATOR

Original No. 1,598,945, dated September 7, 1926, Serial No. 508,670, filed October 19, 1921. Application for reissue filed September 5, 1928. Serial No. 304,098.

By way of explanation it may be stated that, ordinarily, two persons are required for the successful operation of an excavator, namely, one person to operate the engine, and another person to operate the line which dumps the bucket.

The foregoing being understood, it may be stated that it is one object of this invention to provide a simple means whereby the engineer, alone, may dump the bucket, the services of one man thus being dispensed with.

Excavating apparatus of this character necessarily includes appropriate mechanism for operating the bucket or dipper for excavating action, which mechanism may be mounted on the truck or crane body, and also suitable dipper tripping means, and a noteworthy object in view is to avail of said dipper operating mechanism on the crane body as a source of power for effecting operation of the dipper tripping means.

More particularly, this dipper operating mechanism is mounted on the truck or crane body and includes one or more winding drums which take up and pay out cables in effecting excavating action on the part of the dipper. These drums are mounted on shafts and clutched thereto by suitably operable clutch devices. The shaft or shafts are constantly rotated or driven by the power source of the excavator, and a special object of the invention is to provide appropriate instrumentalities for utilizing one of these shafts as a means for causing effective operation of the dipper tripping means.

Specifically, the shaft on which the main excavating drum is mounted, drives another drum which takes up a trip cable included in the dipper tripping means to cause tripping action thereof, said operation being effected by proper manipulation of a clutch device for setting up a driving connection between the drums aforesaid.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 2:
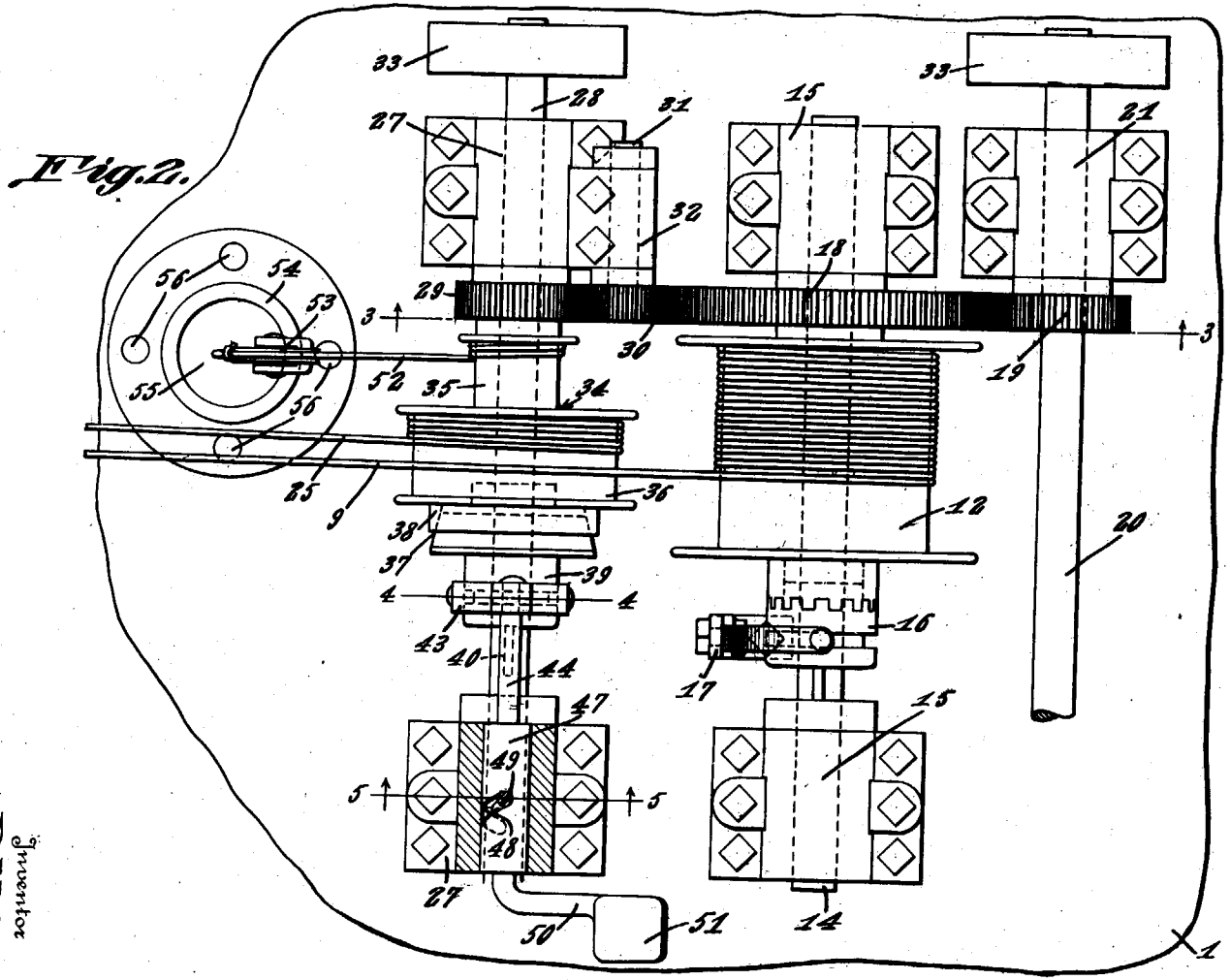

Figure 1 shows in side elevation, a device constructed in accordance with the invention, parts being broken away; Figure 2 is a top plan wherein parts are broken away and sectioned; Figure 3 is a section on the line 3—3 of Figure 2; Figure 4 is a section on the line 4—4 of Figure 2; Figure 5 is a section on the line 5—5 of Figure 2.

The device forming the subject matter of this application may be mounted on and used in connection with excavators or shovels of widely different sorts. By way of illustration, however, there is shown an excavator including a support or truck 1 mounted on wheels 2 and carrying a boom 3 supported by guys 4. An arm 5 is slidably supported in the boom 3, as is common in the art. The arm 5 carries a bucket 6 which may include a hinged bottom 7 held closed by a latch 8. The arm 5 and the bucket 6 are operated by a flexible element 9 which may be connected at 10 to the bucket, the flexible element being passed over idlers 11 carried by the bucket and by the boom 3.

The flexible element 9 is wound around a drum 12 loose on a shaft 14, the shaft being journaled in bearings 15 on the support 1. The drum 12 may be connected to the shaft 14 through the instrumentality of a clutch 16 operated by any suitable means 17. A gear wheel 18 is secured to the shaft 14 and meshes into a pinion 19 on a shaft 20 journaled in bearings 21 on the support 1. The shaft 20 is operatively connected at 22 with an engine 23 on the support 1, the engine deriving its power from a boiler 24—although, of course, whether the shaft 20 be driven by a steam engine or by a motor of some other kind, is purely a matter of choice.

The latch 8 which holds the bottom 7 of the bucket 6 closed is under the control of a flexible element 25 engaged around sheaves 26 on the arm 25. Heretofore, it has been the common custom to appoint one person to operate or pull the flexible element 25, thereby to dump the bucket 6, and to appoint another person to operate the clutch 16 by the means indicated at 17. As hereinbefore intimated, the present invention aims to provide mechanism whereby the person operating the clutch 17 may, likewise, operate the flexible element 25 to dump the bucket 6.

With the objects last above alluded to in view, bearings 27 are mounted on the support or truck 1, a shaft 28 being journaled in the bearings. Any suitable means may be provided for rotating the shaft 28. If preferred, the shaft 28 may carry a gear wheel 29 meshing into a pinion 30 on a shaft 31 journaled in an offset bearing 32 on one of the members 27. The pinion 30 meshes into the gear wheel 18 on the shaft 14. It may be expedient to place wheels 33 on the ends of the shafts 28 and 20, so that the shaft 28 can be driven from the shaft 20 by means of a belt, sprocket wheel or the like, should this method be preferred to the method embodying the use of the gear wheel 29 and the pinion 30.

A drum 34 is loose on the shaft 28 and includes a part 35 and a part 36. The flexible element 25 which controls the bottom 7 of the bucket 6 is trained around the part 36 of the drum 34 as shown to best advantage in Figure 2. The drum 34 may be connected to the shaft 28 by a clutch 37 of any preferred sort. The clutch 37 may include a part 38 connected to the member 35 of the drum 34 and a part 39 splined as indicated at 40, to the shaft 28, to slide therealong, into and out of operative connection with the member 38 of the clutch. The member 39 of the clutch 37 may be grooved circumferentially, as indicated at 41 to receive the fingers 42 of a shifting fork 43.

The numeral 44 denotes a rock shaft, including an enlarged part 47 journaled in a bearing 45 secured at 46 to one of the members 27. The enlarged part 47 of the shaft 44 is supplied with a spiral groove 48 engaged by a projection 49, such as a screw, carried by the bearing 45. At its outer end, the rock shaft 44 is supplied with a crank arm 50 carrying a pedal 51. The inner end of the rock shaft 44 is journaled in the shifting fork 43, and is held therein, as indicated at 51 so that when longitudinal movement is imparted to the rock shaft 44, as hereinafter explained, a corresponding movement will be imparted to the shifting fork 43.

A flexible element 52 is wound about the part 35 of the drum 34 and is carried across a pulley or guide 53 mounted on the upper end of a tubular standard 54 connected at 56 to the support 1. The flexible element 52 extends downwardly into the standard 54 a weight 55 being attached to the lower end of the flexible element, the weight being mounted slidably in the standard 54.

Let it be supposed that the drum 34 is not connected to the shaft 28 by the clutch 37. Then, as the bucket 6 moves, during the operation of the machine, the drum 34 will rotate freely on the shaft 28, the flexible element 25 paying off the member 36 of the drum, without operating the latch 8 and permitting the bottom 7 of the bucket or scoop 6 to open. The weight 55 and the flexible element 52, cooperating with the part 35 of the drum 34, impart reverse rotation to the drum and serve to take up the slack in the flexible element 25. When it is desired to dump the bucket or scoop 6, the operator simply places his foot on the pedal 51, the shaft 44 being rocked. When the shaft 44 is rocked, longitudinal movement will be imparted to the shaft, because the projection 49 is engaged in the spiral groove 48 of the enlarged part 47 of the shaft. When longitudinal movement is imparted to the shaft 44, the shaft will carry the shifting fork 43 inwardly, the member 39 of the clutch 37 being engaged with the member 38 of the clutch, the member 38, it being recalled, being carried by the member 36 of the drum 34. The drum 34 now is coupled up with the shaft 28 and rotation will be imparted to the drum 36 through a gear train comprising the gear wheel 29, the pinion 30 and the gear wheel 18. Thus, a jerk will be given to the flexible element 25 and the latch 8 will be withdrawn, thereby permitting the bottom 7 of the bucket 6 to open. The person handling the clutch operating means 17 may readily actuate the rock shaft 44 through the instrumentality of the pedal 51, and thus, the services of an additional man may be dispensed with.

The excavator construction hereinbefore described, attains the objects noted inasmuch as the excavator drum 12 driven by the shaft 14 is located on the truck or crane body 1 and through the driving instrumentalities 29, 30, etc., provides the power for causing effective operation of the trip drum 36.

What I claim is:—

A device of the class described comprising a truck, a bucket, an arm carrying the bucket, a forwardly extended boom on the truck, the arm being slidable in the boom, an engine on the truck, a first shaft journaled on the truck and disposed forwardly of the engine, a second shaft located between the engine and the first shaft and journaled on the truck, means for dumping the bucket, said means embodying a first flexible element, a first drum rotatable on the first shaft, the first flexible element being wound in one direction about the first drum, means for swinging the arm, said means including a second flexible element mounted to slide on the boom, a second drum mounted to rotate on the second shaft, the second flexible element being wound about the second drum, a gear train connecting both shafts with the engine, clutches connecting the respective shafts with the corresponding drums, a tubular standard mounted on the truck and located in front of the first shaft, a weight slidably housed within the standard, and a third flexible element, one end of which is wound about the first drum in a direction opposite to that of the first flexible element, the third flexible element being mounted slidably on the upper end of the tubular standard, the other end of the third flexible element being extended downwardly into the standard and being connected to the weight, the standard constituting means for preventing the weight and the adjacent portion of the third flexible element from coming into contact with the first flexible element.

In testimony whereof I have hereunto signed my name to this specification.

RALPH VOLK.